United States Patent [19]

Fujiyoshi

[11] Patent Number: 4,906,307
[45] Date of Patent: Mar. 6, 1990

[54] FLUX USED FOR BRAZING ALUMINUM-BASED ALLOY

[75] Inventor: Tatuya Fujiyoshi, Tokyo, Japan

[73] Assignee: Calsonic Corporation, Tokyo, Japan

[21] Appl. No.: 246,778

[22] Filed: Sep. 20, 1988

[30] Foreign Application Priority Data

Oct. 16, 1987 [JP] Japan .................................. 62-259462
Nov. 27, 1987 [JP] Japan .................................. 62-297721
Feb. 9, 1988 [JP] Japan .................................. 63-26649

[51] Int. Cl.$^4$ .............................................. B23K 35/34
[52] U.S. Cl. ....................................... 148/26; 228/223; 228/263.17
[58] Field of Search ..................... 148/23, 25, 26; 228/223, 263.17

[56] References Cited

U.S. PATENT DOCUMENTS

| | | | |
|---|---|---|---|
| 3,951,328 | 4/1976 | Wallace et al. | 148/26 |
| 4,541,876 | 9/1985 | Hwang | 148/26 |
| 4,645,119 | 2/1987 | Haramaki et al. | 228/263.17 |
| 4,723,597 | 2/1988 | Sonoda | 148/26 |

FOREIGN PATENT DOCUMENTS

| | | | |
|---|---|---|---|
| 58-27037 | 6/1983 | Japan . | |
| 76758 | 4/1988 | Japan | 228/263.17 |
| 63-177999 | 7/1988 | Japan . | |
| 1055914 | 1/1967 | United Kingdom . | |

Primary Examiner—Robert McDowell
Attorney, Agent, or Firm—Foley & Lardner, Schwartz, Jeffery, Schwaab, Mack, Blumenthal & Evans

[57] ABSTRACT

Fluxes for use in brazing aluminum-based alloy pieces are disclosed. One is a flux which comprises 70 to 90% wt % $K_2SiF_6$ and 30 to 10 wt % $AlF_3$. The other is a flux which comprises 98.5 to 94 wt % base composition which includes $K_2SiF_6$ whose amount is 70 to 90 wt % of the base composition and $AlF_3$ whose amount is 30 to 10 wt % of the base composition; 0.5 to 3 wt % LiF; and 1 to 3 wt % NaF. In order to facilitate the application of the flux to the pieces to be brazed, polybutene is used as a dispersing agent.

9 Claims, 3 Drawing Sheets

FLUX USED FOR BRAZING ALUMINUM-BASED ALLOY

BACKGROUND OF THE INVENTION

1. Field of the Invention

The present invention relates in general to fluxes which, in brazing, are applied to the metal pieces to be united to reduce the melting point of solders and filler metals and to prevent the formation of oxides, and more particularly, the present invention relates to the fluxes of a type which is used when aluminum-based alloys are brazed.

2. Description of the Prior Art

Nowadays, for lightening the weight and reducing the production cost, most of cores of automotive radiators are constructed of aluminum alloy.

For producing the core, aluminum alloy parts to be united are arranged closely having a suitable solder disposed therebetween, and a suitable flux is applied to contacting surfaces defined between the solder and each aluminum alloy part, and then these parts are heated in a heating furnace to be brazed having the solder melted.

One of conventional fluxes which are used for brazing aluminum alloy pieces is disclosed in British Patent No. 1,055,914. The flux of this Patent contains $AlF_3$ (aluminum fluoride) and $KF$ (potassium fluoride) as major parts.

In addition to this conventional flux, other fluxes containing a chloride as a major part have been hitherto used.

However, some of the above-mentioned conventional fluxes have such a drawback that after brazing of the aluminum alloy pieces, there inevitably remains a residue which tends to corrode the aluminum alloy product. Thus, it has been necessary to rinse the product for removing the undesirable residue.

That is, the flux of British Patent No. 1,055,914 can not avoid remaining of potassium fluoride ($KF$) which tends to corrode the aluminum alloy pieces. In case of the fluxes which contain chloride as a major part, it is impossible to avoid remaining of a residue which is water-soluble, hygroscopic and corrosive.

Rinsing these corrosive residues after the brazing procedure causes increase in production steps and thus increase in production cost of the products.

SUMMARY OF THE INVENTION

It is therefore an object of the present invention to provide a flux for aluminum alloy brazing, which is free of the above-mentioned drawbacks.

In accordance with a first aspect of the present invention, there is provided a flux for use in brazing aluminum alloy pieces, which comprises 70 to 90 wt % $K_2SiF_6$; and 30 to 10 wt % $AlF_3$.

In accordance with a second aspect of the present invention, there is provided a flux for use in brazing aluminum alloy pieces, which comprises 98.5 to 94 wt % base composition, the base composition including $K_2SiF_6$ whose amount is 70 to 90 wt % of the base composition and $AlF_3$ whose amount is 30 to 10 wt % of the base composition; 0.5 to 3 wt % $LiF$; and 1 to 3 wt % $NaF$.

In accordance with a third aspect of the present invention, there is provided a method of brazing aluminum alloy pieces, which comprises by steps:

(a) preparing a flux which comprises 70 to 90 wt % $K_2SiF_6$ and 30 to 10 wt % $AlF_3$;

(b) uniformly dispersing the flux in a polybutene to provide a suspension, the polybutene being a copolymer containing isobutylene as a major part and having at its terminal end a double bond and represented by the following formula:

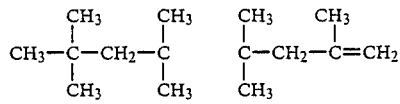

(c) applying the suspension to portions which are to be brazed.

In order to solve the above-mentioned drawbacks encountered in the conventional fluxes, the applicant has carried out various examinations and tests and finally discovered important facts, which will be summarized in the following.

In accordance with the present invention, there is provided a first flux which comprises 70 to 90 wt % $K_2SiF_6$ and 30 to 10 wt % $AlF_3$.

In accordance with the present invention, there is further provided a second flux which comprises 98.5 to 94 wt % base composition which includes $K_2SiF_6$ whose amount is 70 to 90 wt % of the base composition and $AlF_3$ whose amount is 30 to 10 wt % of the base composition; 0.5 to 3 wt % $LiF$; and 1 to 3 wt % $NaF$.

Similar to the above-mentioned conventional flux, the first or second flux according to the present invention is dispersed into water to provide a suspension which is to be applied to aluminum alloy pieces to be united or brazed.

If polybutene is used as a dispersing agent in place of water, more effective brazing work is expected. That is, the above-mentioned first or second flux of the invention is uniformly dispersed in polybutene which is a copolymer containing isobutylene as a major part and has at its terminal end a double bond and is represented by the following formula:

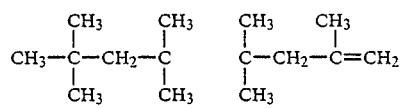

The mixture or suspension thus produced has such an advantage that the application of the flux to only the target portions is readily achieved and thus the consumption of the flux is reduced.

That is, since the viscosity of the polybutene is considerably high as compared with water, the application of the flux to only the really necessary portions becomes possible. Since the polybutene used as the dispersing agent of the flux is depolymerized and sublimated at about 400 to 450° C. which is lower than the brazing temperature (usually about 600° C.) of aluminum alloy pieces, there is no possibility of producing carbon residue after the brazing.

Thus, by using as the dispersing agent of the flux the polybutene which is one of synthetic resins, the brazing between aluminum alloy pieces is achieved with less amount of flux and without inducing deterioration in brazing performance.

Even when water or polybutene is used as the dispersing agent for the flux of the present invention, there is no possibility of producing a residue which tends to corrode aluminum-based alloy. Thus, there is no need of rinsing the brazed portions after the brazing.

BRIEF DESCRIPTION OF THE DRAWINGS

Other objects and advantages of the present invention will become apparent from the following description when taken in conjunction with the accompanying drawings, in which:

FIGS. 6 and 7 are plan views of another test tool for realizing the performance of a flux according to the present invention, in which FIG. 6 shows a condition before brazing, while FIG. 7 shows a condition after brazing.

DETAILED DESCRIPTION OF THE INVENTION

In the following, several experiments which have been carried out by the inventor will be described.

First, description on the above-mentioned first flux will be made.

A. Example-1

As a material of flux, there was prepared a composition containing 70 wt % $K_2SiF_6$ and 30 wt % $AlF_3$. These were mixed to provide a 100 wt % base composition of the flux.

Figure 1:
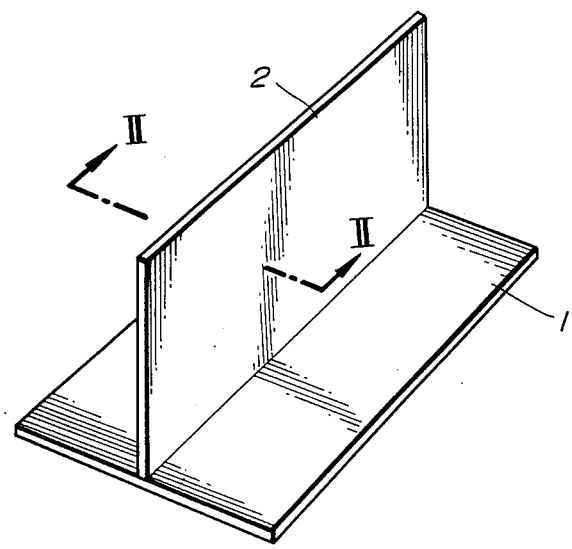
FIG. 1 is a perspective view of a test tool used for realizing the performance of a flux according to the present invention.

The flux was put into water and stirred to provide a 10 wt % suspension. Then, the suspension was applied by the amount of 5 to 10 g/m$^2$ to the mutually contacting portions of two aluminum alloy plates 1 and 2 which were assembled in a manner as shown in FIG. 1.

One of the plates 1 and 2, that is, the plate 1 had a thickness of 1.0 mm and was constructed of JIS 3003 material (which comprises not higher than 0.6% Si, not higher than 0.7% Fe, 0.05 to 0.20% Cu, 1.0 to 1.5% Mn, not higher than 0.10% Zn, not higher than 0.15% impurities (the amount of each impurity is not higher than 0.05%), and a balance of Al) was used. The other plate 2 had a thickness of 0.6 mm and was constructed of a clad member which comprises a plate of JIS 3003 as a structural base, and layers of JIS 4343 material applied to opposite surfaces of the structural base plate at a rate of 10%, the JIS 4343 material comprising 6.8 to 8.2% Si, not higher than 0.8% Fe, not higher than 0.25% Cu, not higher than 0.10% Mn, not higher than 0.20% Zn, not higher than 0.15% impurities (the amount of each impurity is not higher than 0.05%) and a balance of Al.

After drying the flux suspension on the plates 1 and 2, these plates 1 and 2 were put into a heating furnace and heated in a nitrogen gas atmosphere of −30° C. dew point at 600 ° C. for 3 minutes. With this, the material of JIS4343 on the plate 2 was melted and the brazing of the two plates 1 and 2 was achieved.

Figures 2A, 2B, 2C, 2D:
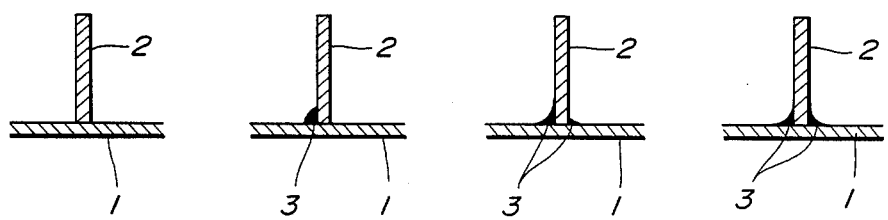
FIGS. 2A to 2D are sectional views, each being taken along the line II—II of FIG. 1, showing respectively four brazing conditions.

After completion of the brazing, the plates 1 and 2 were put out from the heating furnace, and the brazing condition was checked. The check revealed that although, as is shown in FIG. 2C, the shape of the fillet 3 formed on the contacting portions of the plates 1 and 2 was somewhat poor, the plates 1 and 2 were completely brazed throughout the contacting portions thereof. Thus, it was recognized that the flux brought about a sufficient brazing.

Thereafter, the united plates 1 and 2 were kept in an atmosphere of 40° C. temperature, 95% humidity for 72 hours and thereafter, the outer surfaces of the united plates 1 and 2 were checked visually to examine whether the flux residue corroded the plates 1 and 2 or not. It was revealed that the flux residue had no corrosion action to the aluminum-based alloy plates.

B. Example-2

As a flux, a composition comprising 80 wt % $K_2SiF_6$ and 20 wt % $AlF_3$ was prepared. These components were mixed to provide a 100 wt % composition of the flux.

With use of this flux, the same test as the above-mentioned Example-1 was carried out. The test revealed that although the shape of the fillet was somewhat poor, the flux brought about a sufficient brazing and the flux residue did not have a corrosion action to the aluminum-based alloy plates.

C. Example-3

As a flux, a composition comprising 85 wt % $K_2SiF_6$ and 15 wt % $AlF_3$ was prepared. These components were mixed to provide a 100 wt % composition of the flux.

Using this flux, the same test as the above-mentioned Example-1 was carried out. The test revealed that as is shown in FIG. 2D, the shape of the fillet was good, a sufficient brazing strength was obtained and the flux residue did not have a corrosion action to the aluminum alloy plates.

D. Example-4

As a flux, a composition comprising 90 wt % $K_2SiF_6$ and 10 wt % $AlF_3$ was prepared. These components were mixed to provide a 100 wt % composition of the flux.

Using this flux, the same test as the above-mentioned Example-1 was carried out. The test revealed that as is shown in FIG. 2D, the shape of the fillet was poor, a sufficient brazing strength was obtained and the flux residue did not have a corrosion action to the aluminum alloy parts.

E. Reference-1

As a flux, a composition comprising 65 wt % $K_2SiF_6$ and 35 wt % $AlF_3$ was prepared. The components were mixed to provide a 100 wt % composition of the flux.

Using this flux, the same test as the Example-1 was carried out. The test revealed that, as is shown in FIG. 2B, the plates 1 and 2 were brazed partially and thus a sufficient brazing strength was not obtained

F. Reference-2

A flux containing no $K_2SiF_6$ and 100 wt % $AlF_3$ was used.

Using this flux, the same test as the Example-1 was carried out. The test revealed that, as shown in FIG. 2A, the two plates 1 and 2 were not brazed at all.

The results of these tests are shown in Table-1. In the TABLE, the mark "x" represents that as is shown in FIG. 2A, the contacting portions of the plates 1 and 2 were not wetted at all by the solder (viz., JIS 4343 material) and the plates 1 and 2 were not brazed, the mark "Δ" represents that, as shown in FIG. 2B, only parts of the contacting portions of the plates 1 and 2 were wetted and brazing strength was thus poor, the mark "○" represents that as shown in FIG. 2C, the contacting portions were entirely wetted by the solder and the two plates 1 and 2 were tightly brazed irrespective a poor shape of the fillet 3, and the mark "⊙" represents that, as is shown in FIG. 2D, the contacting portions of the two plates 1 and 2 were entirely wetted, the two plates 1 and 2 were tightly brazed and the shape of the fillet 3 was excellent.

In the following, description on the afore-mentioned second flux will be made.

A. Example-1

As a base material, there was prepared a composition containing 70 wt % $K_2SiF_6$ and 30 wt % $AlF_3$. As a flux, there was prepared a composition which comprises 98.5 wt % the base material, 0.5 wt % LiF and 1.0 wt % NaF.

Using this flux, the same test as the afore-mentioned Example-1 of the first flux was carried out. The test revealed that the shape of the fillet was poor, the flux brought about a sufficient brazing strength and the flux residue did not have a corrosion action to the aluminum alloy plates 1 and 2.

B. Example-2

As a base material, a composition containing 70 wt % $K_2SiF_6$ and 30 wt % $AlF_3$ was prepared. As a flux, there was prepared a composition which comprises 94 wt % the base material, 3.0 wt % LiF and 3.0 wt % NaF.

The same test was carried out using this flux. The test revealed that the shape of the fillet was poor, the flux brought about a sufficient brazing strength and the flux residue did not have a corrosion action to the aluminum alloy plates 1 and 2.

C. Example-3

As a base material, a composition containing 85 wt % $K_2SiF_6$ and 15 wt % $AlF_3$ was prepared. As a flux, there was prepared a composition which comprises 96 wt % the base material, 1.0 wt % LiF and 3.0 wt % NaF.

The same test was carried out using this flux. The test revealed that the shape of the fillet was good, the flux brought about a sufficient braxing strength and the flux residue did not have a corrosion action to the aluminum alloy plates.

D. Example-4

As a base material, a composition containing 85 wt % $K_2SiF_6$ and 15 wt % $AlF_3$ was prepared. As a flux, there was prepared a composition which comprises 96 wt % the base material, 2.0 wt % LiF and 2.0 wt % NaF.

The same test was carried out using this flux. The test revealed that the shape of the fillet was good, the flux brought about a sufficient brazing strength and the flux residue did not have a corrosion action to the aluminum alloy plates.

E. Example-5

As a base material, a composition containing 85 wt % $K_2SiF_6$ and 15 wt % $AlF_3$ was prepared. As a flux, there was prepared a composition which comprises 96.5 wt % the base material, 1.5 wt % LiF and 2.0 wt % NaF.

The same test was carried out using this flux. The test revealed that the shape of the fillet was good, the flux brought about a sufficient brazing strength and the flux residue did not have a corrosion action to the aluminum alloy plates.

F. Example-6

As a base material, a composition containing 90 wt % $K_2SiF_6$ and 10 wt % $AlF_3$ was prepared. As a flux, there was prepared a composition which comprises 98.5 wt % the base material, 0.5 wt % LiF and 1.0 wt % NaF.

The same test was carried out using this flux. The test revealed that the shape of the fillet was good, the flux brought about a sufficient brazing strength and the flux residue did not have a corrosion action to the aluminum alloy parts.

G. Example-7

As a base material, a composition containing 90 wt % $K_2SiF_6$ and 10 wt % $AlF_3$ was prepared. As a flux, there was prepared a composition which comprises 97 wt % the base material, 1.0 wt % LiF and 2.0 wt % NaF.

The same test was carried out using this flux. The test revealed that the shape of the fillet was good, the flux brought about a sufficient brazing strength and the flux residue did not have a corrosion action to the aluminum alloy parts.

H. Example-8

As a base material, a composition containing 90 wt % $K_2SiF_6$ and 10 wt % $AlF_3$ was prepared. As a flux, there was prepared a composition which comprises 97 wt % the base material, 2.0 wt % LiF and 1.0 wt % NaF.

The same test was carried out using this flux. The test revealed that the shape of the fillet was good, the flux brought about a sufficient brazing strength and the flux residue did not have a corrosion action to the aluminum alloy parts.

I. Example-9

As a base material, a composition containing 90 wt % $K_2SiF_6$ and 10 wt % $AlF_3$ was prepared. As a flux, there was prepared a composition which comprises 94 wt % the base material, 3.0 wt % LiF and 3.0 wt % NaF.

The same test was carried out using this flux. The test revealed that the shape of the fillet was somewhat poor, the flux brought about a sufficient brazing strength and the flux residue did not have a corrosion action to the aluminum alloy plates.

J. References 1 to 4

By determining the mixing ratio of $K_2SiF_6$, $AlF_3$, LiF and NaF of the flux to a ratio other than the ratio determined by the above-described Examples of the second flux, various reference fluxes were prepared as shown in FIG. 2, and the same tests were carried out using the reference fluxes. The tests revealed that, as shown in FIG. 2B, in all reference cases, only parts of the plates 1 and 2 were brazed and thus sufficient brazing was not obtained.

The results of these tests of the Examples of the second flux and the reference fluxes are shown in Table-2. In this TABLE, the marks identical to those of TABLE-1 represent the same meanings.

When, as has been mentioned hereinafore, polybutene was used as a dispersing agent in place of water, more effective brazing work was achieved. In order to discover this advantageous phenomenon, the applicant has carried out the following experiments.

Figure 3:
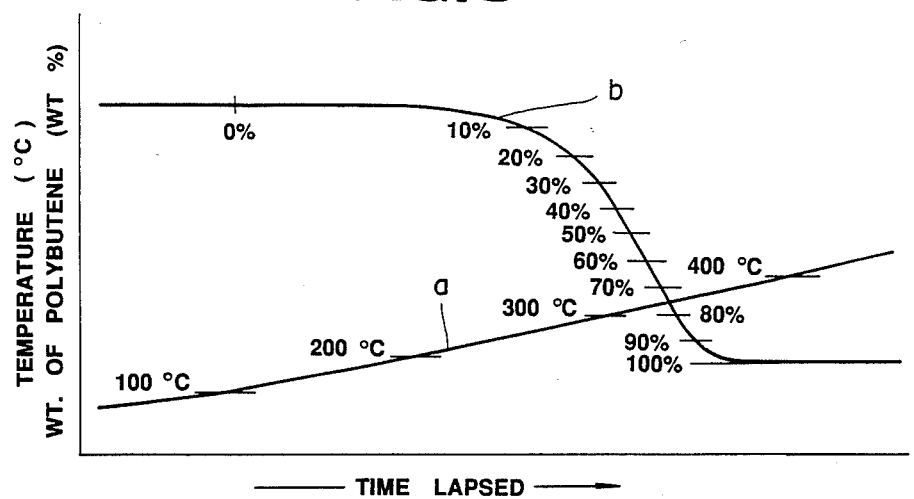
FIG. 3 is a graph showing the manner in which the weight of polybutene is reduced as temperature increases.

Polybutene of 1000 molecular weight was put in a heating furnace and gradually heated in a manner as depicted by the curve "a" in FIG. 3 while measuring the weight of the polybutene. The weight of the polybutene was decreased in a manner as depicted by the curve "b" of the graph, and the polybutene was almost fully sublimated at about 450° C. with no residue.

From this matter, it was realized that the polybutene was depolymerized and fully sublimated at a temperature lower than the brazing temperature (600° C.) of aluminum alloy.

Polybutene whose molecular weight is 200 to 2500 could be also used. The viscosity of it changed as the molecular weight changed (that is, the viscosity increased as the molecular weight increased and, for example, the viscosity was about 10000 cp (centipoise) when the molecular weight was 1000). Thus, selection of the polybutene was so made as to match the viscosity thereof with the shape of the aluminum alloy pieces to be united. Polybutene having a viscosity of about 8000 cp was preferred when producing a heat exchanger. When lowering of the viscosity was needed, an organic solvent (for example, paraffinic hydrocarbon) was added to the polybutene.

In addition to the above-mentioned experiments, the applicant has carried out various experiments by using the polybutene and finally discovered important facts which will be summarized in the following.

When the polybutene is used as a dispersing agent for the flux which is disclosed in Japanese Patent Second Provisional Publication No. 58-27037 (which has been placed on the market with the trade name "NOCOLOK FLUX"), effective brazing work is achieved. The flux contains 65.6 to 99.9 wt % $KALF_4$ and 34.4 to 0.1 wt % $K_2SiF_6$.

That is, because of the relatively high viscosity of the polybutene, the flux can be applied to only the portions which really necessitate the flux application. This induces reduction in consumption of the flux and reduction in the amount of residue produced on the brazed product.

Experiment has revealed that the amount of the flux in the polybutene should be within a range from 10 to 50 %.

This is because of the following. That is, if the amount of the flux is less than 10%, the flux lacks its absolute amount and thus greatly lowers the brazing property, while, if the amount of the flux exceeds 50%, the dispersion of the flux in the polybutene becomes poor thereby inducing poorness in flowability of the polybutene. The poor flowability of the dispersing agent makes the application of flux difficult.

Figure 4:
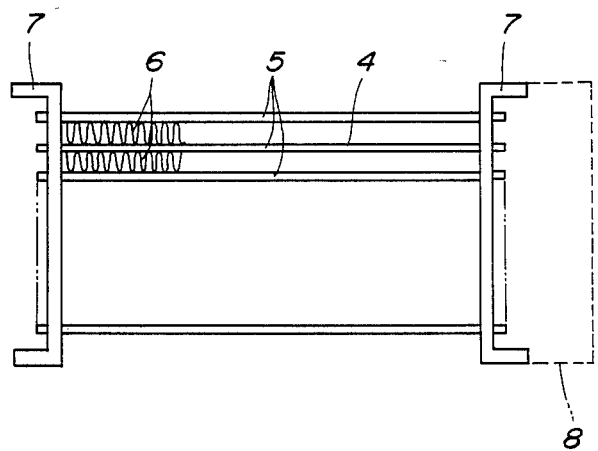
FIG. 4 is front view of an automotive radiator of aluminum which is produced by using the flux according to the present invention.
Figure 5:
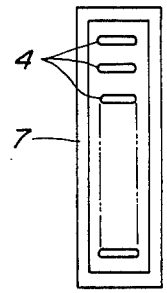
FIG. 5 is a side view of the radiator of FIG. 4.

In order to check the performance of this polybutene-dispersed flux, the following experiment has been carried out by the applicant by constituting an automotive heat exchanger as shown in FIGS. 4 and 5.

The heat exchanger had a structure comprising a core portion 4 including coolant conducting tubes 5 and fins 6, and side plates 7 holding opposed end portions of the coolant conducting tubes 5 in which the tubes 5 and the fins 6 are to be brazed and the tubes 5 and the side plates 7 are to be brazed.

The coolant conducting tubes 5 were constructed of an aluminum clad plate having a thickness of 0.34 mm, the fins 6 were constructed of an aluminum alloy plate having a thickness of 0.10 mm, and the side plates 7 were constructed of an aluminum clad plate having a thickness of 1.0 mm.

The clad plate constituting each coolant conducting tube 5 comprises a tubular core member, a solder material covering the outer surface of the core member and a victim corrosion layer covering the inner surface of the core member. The clad rate of the solder material and that of the victim corrosion layer were each 10%. It is to be noted that a clad rate is the rate of the thickness of a clad layer to the thickness of the entire of a clad plate. As the tubular core member, JIS 3003 material was used, which comprises not higher than 0.6% Si, not higher than 0.7% Fe, 0.05 to 0.20% Cu, 1.0 to 1.5% Mn, not higher than 0.10% Zn, not higher than 0.15% impurities (the amount of each impurity is not higher than 0.05%), and a balance of Al. As the solder material, JIS 4343 material was used, which comprises 6.8 to 8.2% Si, not higher than 0.8% Fe, not higher than 0.25% Cu, not higher than 0.10% Mn, not higher than 0.20% Zn, not higher than 0.15% impurities (the amount of each impurity is not higher than 0.05% and a balance of Al. As the victim corrosion layer, JIS 7072 material was used, which comprises not higher than 0.7% Si and Fe in total, not higher than 0.10% Cu, not higher than 0.10% Mn, not higher than 0.10% Mg, 0.8 to 1.3% Zn, not higher than 0.15% impurities (the mount of each impurity is not higher than 0.05%), and a balance of Al.

As the material for the fins, JIS 3003 material was used, which comprises not higher than 0.6% Si, not higher than 0.7% Fe, 0.05 to 0.20% Cu, 1.0 to 1.5% Mn, 1.5% Zn, 0.15% impurities (the amount of each impurity is not higher than 0.05%) and a balance of Al.

The clad plate constituting each side plate 7 was a member which comprises a core member of JIS 3003 material and a solder of JIS 4343 material. The solder covers the inner surface of the core member at a clad rate of 10%.

The coolant conducting tubes 5, the fins 6 and the side plates 7 were temporarily assembled in a manner as shown in FIGS. 4 and 5. The assembly was brazed by using the above-mentioned polybutene-dispersed flux. For comparison, similar brazing test was carried out by using a conventional water-dispersed flux.

The brazing with the polybutene-dispersed flux was carried out in a condition wherein $N_2$ gas whose due point was −30° C. was used as a non-corrosive atmosphere, and the amount of the flux applied was 2 to 3 g/m². The temporary assembly was preheated at 150° C. for 3 minutes and thereafter heated at 600° C. for 3 minutes. In the conventional brazing wherein water was used as the dispersion agent, the application of the flux was made through a dipping method and the amount of flux applied was 5 g/m².

The heat exchangers thus produced were then subjected to a heat radiation performance test and an endurance test. The results of these tests are depicted in TABLE-3.

The endurance test was carried out with an assembly which comprises the heat exchanger thus brazed and a plastic tank 8 (see FIG. 4) fixed to one of the side plates 7 with an interposal of a suitable sealing packing therebetween. That is, the assembly was subjected to a cyclic condition wherein a cycle including a step of cooling the heat exchanger at −30° C. for 30 minutes and a subsequent step of heating the same at 120° C. for 30 minutes is repeated. The endurance degree was judged by the number of the cycles counted when a coolant leakage appeared at the sealing packing interposed between the plastic tank 8 and the associated side plate 7. For example, the endurance degree "750" exhibited by the reference 1 means that the coolant leakage appeared when the cycle was counted 750 times, while, the endurance degree greater than 1000 exhibited by the assembly produced by using the polybutene-dispensed flux means that the leakage did not appear even when the cycle was counted 1000 times.

The improvement in the endurance may be originated from a fact that there was produced no corrugations of the flux residue on the outer surface of the seat plate 4 to which the sealing packing contacted.

The heat radiation performance was estimated by putting the performance of a reference heat exchanger 1 (which was produced by using the conventional water-dispersed flux) at "100". The performance of the heat exchangers 1, 2 and 3 produced by using the polybutene-dispersed flux was judged as compared with the degree "100".

As is seen from TABLE-3, the heat exchangers 1, 2 and 3 produced by using the polybutene-dispersed flux exhibited excellent performances as compared with the reference heat exchanger 1.

Besides the above-described experiments, the applicant has carried out additional examinations and tests and finally discovered another flux which can bring about a desired brazing of aluminum alloy pieces. The flux will be designated by "third flux" for simplification of the following description.

The flux discovered comprises 98 to 90 wt % base composition which includes potassium fluorosilicate ($K_2SiF_6$) whose amount is 30 to 90 wt % to the base composition and zinc fluoride ($ZnF_2$) whose amount is 70 to 10 wt % to the base composition; 1 to 3 wt % sodium fluoride (NaF); and 1 to 7 wt % aluminum fluoride ($ALF_3$).

In order to discover the flux, the following experiments have been carried out by the applicant.

A. Example-1

As a base material, there was prepared a composition containing 30 wt % potassium fluorosilicate and 70 wt % zinc fluoride. As a flux, there was prepared a composition which comprises 94 wt % the base composition, 1 wt % sodium fluoride and 5 wt % aluminum fluoride.

Figure 6:
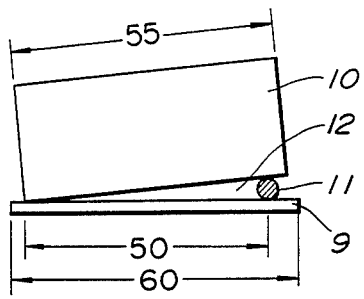

This flux was put into water and stirred to provide 10 wt % suspension. Then, the suspension was applied by the amount of 5 to 20 g/m² to respective outer surfaces of two aluminum alloy plates 9 and 10 which were assembled in a manner as shown in FIGS. 6 and 7.

The assembly was used for testing the brazing ability of the flux. One aluminum alloy plate 10 has both sides coated with a solder. The other aluminum alloy plate 9 is constructed of JIS 3003 material and has a size of 60 mm in length. As shown, the solder-coated plate 10 stands vertically on the other plate 9 with a rounded bar 11 put therebetween. Thus, a wedge-shaped clearance 12 is defined between the two plates 9 and 10.

After drying the suspension on the plates 9 and 10, they were put into a heating furnace and heated in a nitrogen gas atmosphere of lower than −30° C. dew point at 600° C. for 4 minutes.

Figure 7:
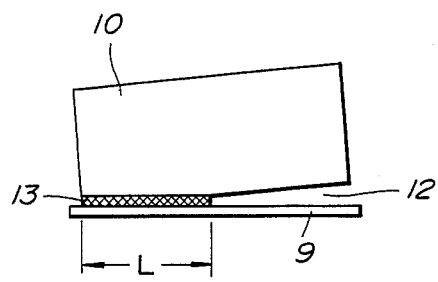

With this heating, the solder 13 on both the plates 9 and 10 became melted and thus, as is shown in FIG. 7, the narrower part of the clearance 12 was covered with the melted solder. The length "L" of the brazed part of the clearance 12 was measured. It is to be noted that the brazing performance of the flux is considered better as the length "L" increases.

The test was carried out changing the rounded bars 11 of different diameters. The bars were 0 (viz., no bar), 1, 2, and 3 mm in diameter. The results of the test are shown in the line "A" of TABLE-4 and depicted by the curve "A" in the graph of FIG. 8.

B. Example-2

As a base material, there was prepared a composition containing 40 wt % potassium fluorosilicate and 60 wt % zinc fluoride. As a flux, there was prepared a composition which comprises 96 wt % the base composition, 1 wt % sodium fluoride and 1 wt % aluminum fluoride.

The flux was put into water and stirred to provide 10 wt % suspension.

The same test as that of the above-mentioned example-1 was carried out. The results are shown in the line "B" of TABLE-4 and depicted by the curve "B" in the graph of FIG. 8.

C. Example-3

As a base material, there was prepared a composition containing 40 wt % potassium fluorosilicate and 60 wt % zinc fluoride. As a flux, there was prepared a composition which comprises 90 wt % the base composition, 3 wt % sodium fluoride and 7 wt % aluminum fluoride.

The same test was carried out. The results of the test are shown in the line "C" of TABLE-4 and depicted by the curve "C" of the graph in FIG. 8.

D. Example-4

As a base material, there was prepared a composition containing 60 wt % potassium fluorosilicate and 40 wt % zinc fluoride. As a flux, there was prepared a composition which comprises 93 wt % the base composition, 2 wt % sodium fluoride and 5 wt % aluminum fluoride.

The same test was carried out. The results of the test are shown in the line "D" of TABLE-4 and depicted by the curve "D" of the graph in FIG. 8.

E. Example-5

As a base material, there was prepared a composition containing 90 wt % potassium fluorosilicate and 10 wt % zinc fluoride. As a flux, there was prepared a composition which comprises 95 wt % the base composition, 2 wt % sodium fluoride and 3 wt % aluminum fluoride.

The same test was carried out. The results are shown in the line "E" of TABLE-4 and depicted by the curve "E" of the graph in FIG. 3.

F. Example-6

As a base material, there was prepared a composition containing 90 wt % potassium fluorosilicate and 10 wt % zinc fluoride. As a flux, there was prepared a composition which comprises 90 wt % the base composition, 3 wt % sodium fluoride and 7 wt % aluminum fluoride.

The same test was carried out. The results of the test are shown in the line "F" of TABLE-4 and depicted by the curve "F" of the graph in FIG. 8.

In the following, reference fluxes which failed to exhibit satisfied results will be described.

G. Reference-1

As a base material, there was prepared a composition containing 60 wt % potassium fluorosilicate and 40 wt % zinc fluoride. As a flux, there was prepared a composition which comprises 91 wt % the base composition and 9 wt % aluminum fluoride. There was no sodium fluoride added to the flux.

The same test as the above-mentioned examples was carried out. The results of the test are shown in the line "G" of TABLE-4 table. The results described in the line "G" is included in the hatched zone of the graph in FIG. 8.

H. Reference-2

As a base material, there was prepared a composition containing 60 wt % potassium fluorosilicate and 40 wt % zinc fluoride. As a flux, there was prepared a composition which comprises 87 wt % the base composition, 4 wt % sodium fluoride and 9 wt % aluminum fluoride.

The same test was carried. The results are shown in the line "H" of TABLE-4 and they are included in the hatched zone of the graph in FIG. 8.

I. Reference-3

As a base material, there was prepared a composition containing 30 wt % potassium fluorosilicate and 70 wt % zinc fluoride. As a flux, there was prepared a composition which comprises 96 wt % the base composition and 4 wt % sodium fluoride. There was no aluminum fluoride added to the flux.

The same test was carried out. The results are shown in the line "I" of TABLE-4, and they are included in the hatched zone of the graph in FIG. 8.

J. Reference-4

As a base material, there was prepared a composition containing 90 wt % potassium fluorosilicate and 10 wt % zinc fluoride. As a flux, there was prepared a composition which comprises 87 wt % the base composition, 4 wt % sodium fluoride and 9 wt % aluminum fluoride.

The same test was carried out. The results are shown in the line "J" of TABLE-4, and they are included in the hatched zone of the graph in FIG. 8.

In order to estimate the performance of the above-mentioned third flux more precisely, some of fluxes which have been proposed by the same applicant will be described in the following.

The applicant has proposed before a flux which comprises 30 to 90 wt % potassium fluorosilicate ($K_2SiF_6$ and 70 to 10 wt % zinc fluoride ($ZnF_2$). (The flux is disclosed in Japanese Patent Application No. 62-8955).

Three types of this flux are shown in TABLE-4, which are denoted by "K", "L" and "M". The results of the test are shown in the lines "K", "L" and "M". It is to be noted that the results of these fluxes are all included in the hatched zone of the graph of FIG. 8.

Japanese Patent Second Provisional Publication No. 58-27037 discloses a flux which comprises 65.6 to 99.9 wt % $KAlF_4$ and 34.4 to 0.1 wt % $K_2SiF_6$, which is denoted by "N" in TABLE-4. The results of the test applied to this flux are shown in the line "N" and depicted by the curve "N" of the graph in FIG. 8.

Figure 8:
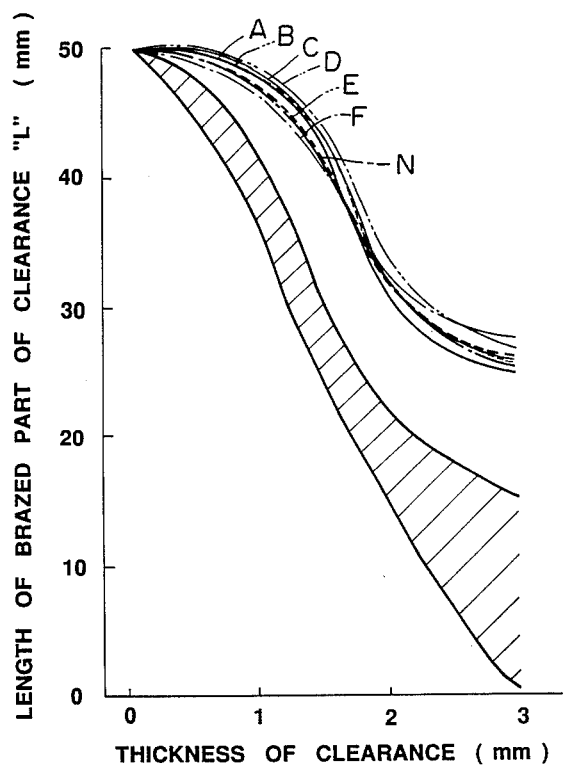
FIG. 8 is a graph showing the performances of the flux according to the present invention and conventional flux.

As will be seen from the data shown in the TABLE-4 and the graph of FIG. 8, the brazing performance of the prior proposed fluxes "K", "L" and "M" is inferior to the flux disclosed in Japanese Patent Second Provisional Publication No. 58-27037.

When comparing the test results of the third flux (which includes the fluxes "A", "B", "C", "D", "E" and "F") with the results of the prior proposed fluxes "K" to "N", it becomes clarified that the brazing performance of the third flux is superior to that of the prior proposed fluxes "K" to "M" and substantially equal to that of the flux disclosed in Japanese Patent Second Provisional Publication No. 58-27037.

TABLE 1

| | TESTS | | Flux Composition (Wt %) | | Brazing Performance | Corrosion Action of Flux |
| --- | --- | --- | --- | --- | --- | --- |
| | | | $K_2SiF_6$ | $AlF_3$ | | |
| A | | 1 | 70 | 30 | ○ | Non |
| B | Examples | 2 | 80 | 20 | ○ | Non |
| C | | 3 | 85 | 15 | ⊙ | Non |
| D | | 4 | 90 | 10 | ○ | Non |
| E | References | 1 | 65 | 35 | △ | — |
| F | | 2 | 0 | 100 | x | — |

TABLE 2

| | Fluxes Tested | | Flux Composition (Wt %) | | | Brazing performance | Corrosion Action of Flux |
| --- | --- | --- | --- | --- | --- | --- | --- |
| | | | Base Composition (Wt % of $K_2SiF_6$:$AlF_3$) | LiF | NaF | | |
| | A | 1 | (70:30) 98.5 | 0.5 | 1.0 | ○ | Non |
| | B | 2 | (70:30) 94 | 3.0 | 3.0 | ○ | Non |
| | C | 3 | (85:15) 96 | 1.0 | 3.0 | ⊙ | Non |
| | D | 4 | (85:15) 96 | 2.0 | 2.0 | ⊙ | Non |
| Examples | E | 5 | (85:15) 96.5 | 1.5 | 2.0 | ⊙ | Non |
| | F | 6 | (90:10) 98.5 | 0.5 | 1.0 | ⊙ | Non |
| | G | 7 | (90:10) 97 | 1.0 | 2.0 | ⊙ | Non |
| | H | 8 | (90:10) 97 | 2.0 | 1.0 | ⊙ | Non |
| | I | 9 | (90:10) 94 | 3.0 | 3.0 | ○ | Non |
| | | 1 | (70:30) 96 | 0 | 4.0 | △ | — |
| References | J | 2 | (70:30) 96 | 4.0 | 0 | △ | — |
| | | 3 | (90:10) 92 | 4.0 | 4.0 | △ | — |
| | | 4 | (85:15) 92 | 4.0 | 4.0 | △ | — |

TABLE 3

| | Flux Composition | Amount of Flux | Heat Radiation Performance | Endurance Degree |
| --- | --- | --- | --- | --- |
| 1 | NOCOLOK:P.butene = 1:7 | 2 g/m² | 106 | 1000 or |

TABLE 3-continued

| | | Flux Composition | Amount of Flux | Heat Radiation Performance | Endurance Degree |
|---|---|---|---|---|---|
| Examples | 2 | NOCOLOK:P.butene = 1:7 | 2.5 g/m² | 106 | 1000 or more |
| | 3 | NOCOLOK:P.butene = 1:7 | 3 g/m² | 105 | 1000 or more |
| Reference | 1 | NOCOLOK:Water = 1:9 | 5 g/m² | 100 | 750 |

TABLE 4

| Fluxes tested | | | Flux composition (wt %) | | | Length (L) of brazed part (mm) | | | |
|---|---|---|---|---|---|---|---|---|---|
| | | | Base composition (wt % of K₂SiF₆:ZnF₂) | NaF | AlF₃ | 0 | 1 | 2 | 3 |
| A | | 1 | (30:70) 94 | 1 | 5 | 50 | 47 | 31 | 25 |
| B | | 2 | (40:60) 96 | 1 | 1 | 50 | 48 | 32 | 26 |
| C | Examples | 3 | (40:60) 90 | 3 | 7 | 50 | 48 | 32 | 28 |
| D | | 4 | (60:40) 93 | 2 | 5 | 50 | 48 | 34 | 27 |
| E | | 5 | (90:10) 95 | 2 | 3 | 50 | 47 | 32 | 26 |
| F | | 6 | (90:10) 90 | 3 | 7 | 50 | 47 | 31 | 25 |
| G | | 1 | (60:40) 91 | 0 | 9 | 50 | 40 | 21 | 15 |
| H | References | 2 | (60:40) 87 | 4 | 9 | 50 | 39 | 20 | 13 |
| I | | 3 | (30:70) 96 | 4 | 0 | 50 | 36 | 15 | 0 |
| J | | 4 | (90:10) 87 | 4 | 9 | 50 | 39 | 20 | 10 |
| K | Prior | 1 | (30:70) 100 | 0 | 0 | 50 | 41 | 20 | 14 |
| L | proposal | 2 | (60:40) 100 | 0 | 0 | 50 | 42 | 22 | 15 |
| M | | 3 | (90:10) 100 | 0 | 0 | 50 | 40 | 18 | 9 |
| N | Japanese Patent Second Provisional Publication 58-27037 | | | 0 | | 50 | 48 | 32 | 26 |

What is claimed is:

1. A flux for use in brazing aluminum-based alloy pieces, comprising:
   70 to 90 wt % $K_2SIf_6$; and
   30 to 10 wt % $AlF_3$.

2. A flux as claimed in claim 1, in which said flux contains 85 wt % $K_2SiF_6$, and 15 wt % $AlF_3$.

3. A flux for use in brazing aluminum-based alloy pieces, comprising:
   98.5 to 94 wt % base composition, said base composition including $K_2SiF_6$ whose amount is 70 to 90 wt % of the base composition and $AlF_3$ whose amount is 30 to 10 wt % of the base composition;
   0.5 to 3 wt % LiF; and
   1 to 3 wt % NaF.

4. A flux as claimed in claim 3, in which said base composition occupies 96 to 98.5 wt % of the flux, and in which said base composition including $K_2SiF_6$ whose amount is 85 to 90 wt % of the base composition and $AlF_3$ whose amount is 15 to 10 wt % of the base composition; in which said LiF occupies 0.5 to 2 wt % of the flux, and said NaF occupies 1.0 to 3.0 wt % of the flux.

5. A method of brazing aluminum-based alloy pieces, comprising by steps:
   (a) preparing a flux which comprises 70 to 90 wt % $K_2SiF_6$ and 30 to 10 wt % $AlF_3$;
   (b) uniformly dispersing said flux in a polybutene to provide a suspension, said polybutene being a copolymer containing isobutylene as a major part and having at its terminal end a double bond and represented by the following formula:

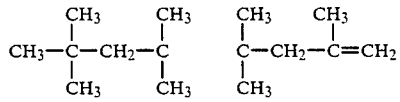

(c) applying said suspension to portions which are to be brazed and brazing said pieces.

6. A method of brazing aluminum-based alloy pieces, comprising by steps:
   (a) preparing a flux which comprises 98.5 to 94 wt % base composition, said base composition including $K_2SiF_6$ whose amount is 70 to 90 wt % of the base composition and $AlF_3$ whose amount is 30 to 10 wt % of the base composition; 0.5 to 3 wt % LiF; and 1 to 3 wt % NaF;
   (b) uniformly dispersing said flux in a polybutene to provide a suspension, said polybutene being a copolymer containing isobutylene as a major part and having at its terminal end a double bond and represented by the following formula:

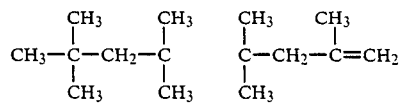

(c) applying said suspension to outer surfaces of aluminum-based alloy pieces which are to be brazed and brazing said pieces.

7. A method of brazing aluminum-based alloy pieces, comprising by steps:
   (a) preparing a flux which comprises 65.6 to 99.9 wt % $KAlF_4$ and 34.4 to 0.1 wt % $K_3AlF_6$;

(b) uniformly dispersing said flux in a polybutene to provide a suspension, said polybutene being a co-polymer containing isobutylene as a major part and having at its terminal end a double bond and represented by the following formula:

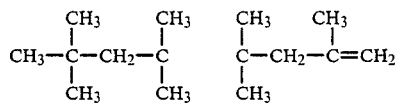

(c) applying said suspension to outer surfaces of the aluminum-based alloy pieces which are to be brazed and brazing said pieces.

8. A flux for use in brazing aluminum-based alloy pieces, comprising:
98 to 90 wt % base composition, said base composition including potassium fluorosilicate whose amount is 30 to 90 wt % to said base composition and zinc fluoride whose amount is 70 to 10 wt % to the base composition;
1 to 3 wt % sodium fluoride; and
1 to 7 % aluminum fluoride.

9. A method of brazing aluminum-based alloy pieces, comprising by steps:
(a) preparing a flux which contains 98 to 90 wt % base composition, said base composition including potassium fluorosilicate whose amount is 30 to 90 wt % to said base composition and zinc fluoride whose amount is 70 to 10 wt % to the base composition; 1 to 3 wt % sodium fluoride; and 1 to 7 % aluminum fluoride;
(b) uniformly dispersing said flux in a polybutene to provide a suspension, said polybutene being a co-polymer containing isobutylene as a major part and having at its terminal end a double bond and represented by the following formula:

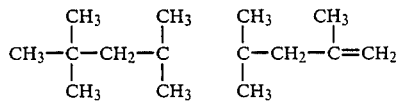

(c) applying said suspension to outer surfaces of aluminum-based alloy pieces which are to be brazed and brazing said pieces.

* * * * *